United States Patent Office 3,021,147
Patented Feb. 13, 1962

3,021,147
SHAFT BUSHING FOR EXPLOSION-PROOF
ELECTRICAL MACHINES
Karl Haas and Siegfried Voll, Nurnberg, Germany, assignors to Siemens-Schuckertwerke Aktiengesellschaft, Berlin-Siemensstadt, Germany, a corporation of Germany
Filed June 10, 1959, Ser. No. 819,261
Claims priority, application Germany June 13, 1958
13 Claims. (Cl. 277—53)

The invention relates to a shaft bushing for explosion-proof electrical machines. The shaft bushing of electrical machines should be designed such that an explosion occurring within the case is prevented from being extended to the outside. In order to achieve this, the gap provided at the place where the shaft is carried through the case should have a predetermined length and must not exceed a predetermined width. In view of the relatively great length of the gap the shaft will readily lock in case of the slightest inaccuracy caused during the machining process.

The invention obviates the aforesaid disadvantages. In accordance with the invention the shaft bushing which is not centered on fixed case portions is placed on the shaft through extremely narrow annular surfaces, while annular spaces are provided between the annular surfaces in the bore of the bushing. The depth of the annular rings corresponds to the admissible width of the gap of the bushing. The bushing may be formed either by the inner bearing cap or by a nonrotating sleeve which is mounted to the case of the machine such that it may not only be adjusted in a plane in perpendicular relation to the axis of the shaft but also be rotated about a point of the axis of the shaft.

Figure 3:
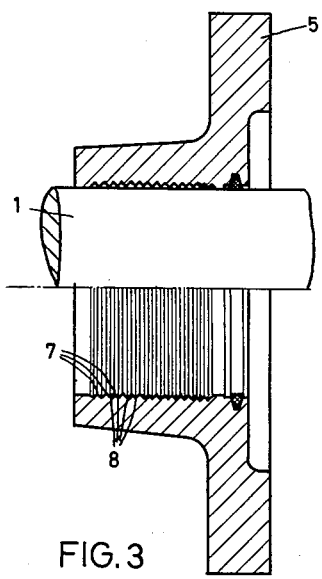
Figure 4:
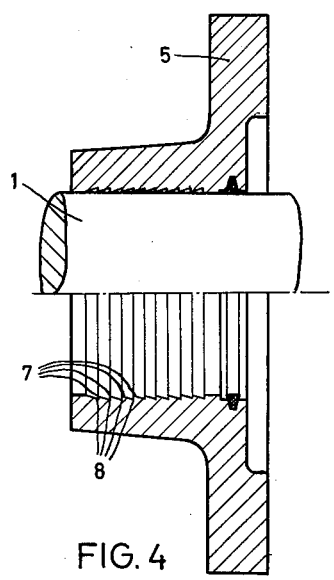

To afford a better understanding of the features of the present invention reference will be made to the accompanying drawing illustrating typical embodiments of the invention. On the drawing FIGURES 1 and 2 are various embodiments of the bearing of an explosionproof electrical machine; and FIGURES 3 and 4 are sectional views of the sleeve constructed in the form of a shaft bushing.

Figure 1:
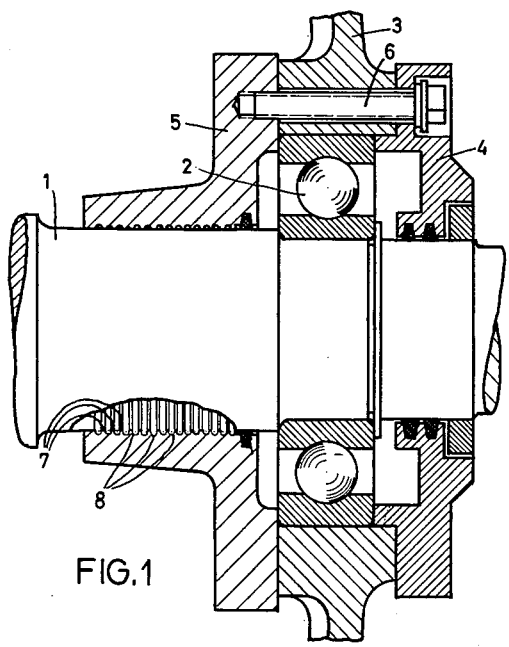

In FIGURE 1 the shaft 1 is supported in the bearing bracket 3 by means of a ball bearing 2. The bearing frame or housing is closed by the outer bearing cap 4 and the inner bearing cap 5. The two caps are secured t othe bearing bracket by means of screws 6. The inner cap 5 is not axially centered at the bearing bracket 3 but is placed on the shaft 1 through extremely narrow annular surfaces 7 distributed along the entire length of the shaft bushing. Half-round grooves 8 are arranged between the narrow annular surfaces.

Figure 2:
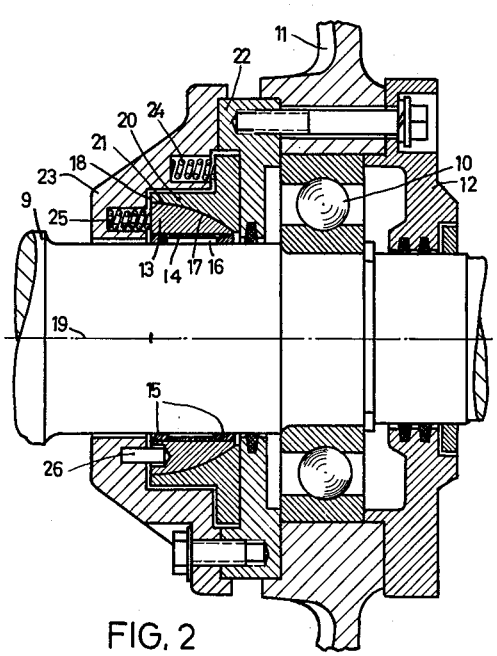

In FIGURE 2 the shaft 9 is supported in the bearing bracket 11 also by means of a ball bearing 10. The bearing frame or housing is closed by the outer bearing caps 12. A shaft bushing 13 formed of steel is arranged on the side of the bearing which faces the interior of the machine. A bronze sleeve 14 is placed in the bore of the shaft bushing 13. Both the bushing and the sleeve are centered on the shaft 9 by means of two extremely narrow annular surfaces 15. Provided between the sleeve and the shaft is an air gap 16 which amounts to approximately 0.1 mm. and which extends between the two annular surfaces. The periphery 17 of the bushing 13 is formed in accordance with a sphere the center of which lies in the point of intersection between a plane laid through the front surface 18 of the bushing 13, and the axis 19 of the shaft. The bushing 13 is surrounded by the intermediate ring 20 formed of steel and provided with a corresponding spherical bore 21. The intermediate ring 20 bears against the inner bearing cap 22 to which a cover 23 is secured. Uniformly distributed on the periphery between the cover 23 and the intermediate ring 20 are springs 24 while betwen the cover 23 and the bushing 13 springs 25 are distributed in the same way. In addition, bushing 13 is guided on bolts 26 which are mounted in the cover 23.

The bushing 13 may also be entirely made of bronze if the intermediate ring 20 is also made of bronze. In this case the bronze material of the intermediate ring should have a greater coefficient of expansion than that of the bushing. It is essential that the bushing should be made of bronze at least along its bore and that the intermediate ring should be made of the same material as that portion of the bushing which faces the intermediate ring.

The bushing 13 according to FIGURE 2 may also be provided with more than two narrow annular surfaces as in the case of the bearing cap 5 according to FIGURE 1. As will be seen from FIGURES 3 and 4 the annular surfaces may also have a triangular or sawtooth-like shape.

The ridges 7 of the shaft bushing which form the extremely narrow annular surfaces are ground off radially during operation of the machine so that the occurrence of jamming is prevented. Where a sleeve such as 14 is used as the shaft bushing it is automatically positioned during assembly so that time-consuming mounting work is avoided. It will be understood that the above description and drawing are illustrative and not in limitation of the invention.

We claim as our invention:

1. A shaft journal for the shaft of an explosion-proof electrical machine, comprising a journal housing, a shaft bushing axially off-center relative to said housing and having axially spaced relatively narrow annular ridges centering said shaft concentric with said bushing, said ridges being of such dimensions and material so as to be grindable down radially during operation of the machine to form annular spaced surfaces seating said shaft in said bushing, said bushing being provided with at least one groove having a predetermined depth disposed between said ridges, whereby said surfaces formed from said ridges during operation of said shaft and said grooves together define at least one annular air tight space around said shaft, thus preventing said shaft from jamming within said housing in the event of an explosion occurring within the machine.

2. A shaft journal according to claim 1, said bushing comprising a sleeve non-rotatably mounted relative to said housing, and means supporting said housing for freely moving and adjusting said sleeve relative to said housing in a plane perpendicular to the axis of said shaft and about a point located on the axis of said shaft, the respective contact surfaces between said sleeve and said supporting means and said housing defining separation gaps for relative movement of said sleeve, said supporting means and said housing in the event of an explosion occurring within the machine.

3. Shaft journal according to claim 1 said shaft bushing having only two said spaced narrow annular surfaces for supporting said bushing relative to said shaft.

4. Shaft journal according to claim 1 said shaft bushing having said narrow annular surfaces distributed along the entire length of the bushing for supporting said bushing relative to said shaft.

5. Shaft journal according to claim 1 wherein the grooves between said annular surfaces have a half-round shape.

6. Shaft journal according to claim 1 wherein the grooves between said annular surface have a triangular shape.

7. Shaft journal according to claim 1 wherein said annular surfaces and grooves therebetween have a saw-tooth-like shape.

8. A shaft journal for the shaft of an explosion-proof electrical machine, comprising a journal housing, a shaft bushing axially off-center relative to said housing and having axially spaced relatively narrow annular ridges for supporting said shaft in said bushing, said ridges being of such dimensions and material so as to be grindable down radially during operation of the machine to form annular spaced surfaces seating said shaft in said bushing, said bushing being provided with rounded grooves having a predetermined depth and disposed between successive ridges, whereby said surfaces formed from said ridges during operation of said shaft and said grooves together define a plurality of annular spaces around said shaft enclosed by the walls of said grooves and by said surfaces, thus preventing said shaft from jamming within said housing in the event of an explosion occurring within the machine.

9. A shaft journal for the shaft of an explosion-proof electrical machine, comprising a journal housing, a shaft sleeve axially off-center toward the inside of the machine relative to said housing and having axially spaced relatively narrow annular surfaces for seating said shaft in said sleeve, bushing means disposed around the periphery of said sleeve for supporting same, said bushing means having a spherical surface generated equidistant from a predetermined point located on the axis of said shaft, an intermediate ring having an inner spherical bore engaging and adjustably supporting said spherical surface of said bushing means, abutment means rigidly fixed to said housing and abutting said intermediate ring to prevent axial movement of the latter toward the outside of the machine, whereby upon occurrence of an explosion within said machine said spherical surface will become adjusted relative to said spherical bore and prevent jamming of said shaft in said housing.

10. Shaft journal according to claim 9, wherein said sleeve is made of bronze at least along its bore while said intermediate ring is made of the same material as that portion of the sleeve which faces the intermediate ring for equal expansion therewith to prevent jamming.

11. Shaft journal according to claim 9, wherein said sleeve and said intermediate ring are both made of bronze, the bronze material used for the intermediate ring having a greater coefficient of expansion than that of the sleeve to prevent locking of said ring relative to said sleeve.

12. Shaft journal according to claim 9, said intermediate ring and said sleeve both being made of steel, said sleeve being provided with a bronze lining on its inner bore, whereby jamming of said sleeve relative to said ring is prevented and whereby said sleeve and ring can withstand relatively high axial impact.

13. A shaft journal for the shaft of an explosion-proof electrical machine, comprising a journal housing, a shaft sleeve axially off-center toward the inside of the machine relative to said housing and having axially spaced relatively narrow annular surfaces for centering said shaft concentrically wtih said sleeve, bushing means disposed around the periphery of said sleeve for supporting same, said bushing means having a spherical surface generated equidistant from a predetermined point located on the axis of said shaft, an intermediate ring having an inner spherical bore engaging and adjustably supporting said spherical surface of said bushing means, abutment means rigidly fixed to said housing and abutting said intermediate ring to prevent axial movement of the latter toward the outside of the machine, and biasing means axially urging said intermediate ring against said abutment means and axially urging said bushing means against said intermediate ring to maintain said sleeve in position relative to said shaft, whereby upon occurrence of an explosion within said machine said spherical surface will become adjusted relative to said spherical bore and prevent jamming of said shaft in said housing.

References Cited in the file of this patent
UNITED STATES PATENTS

| 404,529 | Frick | June 4, 1889 |
| 858,859 | Dalen | July 2, 1907 |
| 1,006,714 | Bell | Oct. 24, 1911 |
| 1,095,840 | Fritz | May 5, 1914 |
| 1,639,521 | MacMurchy | Aug. 16, 1927 |
| 1,908,956 | Chievitz | May 16, 1933 |
| 2,886,351 | Heard | May 12, 1959 |